US007925472B2

(12) United States Patent
Nasr et al.

(10) Patent No.: US 7,925,472 B2
(45) Date of Patent: Apr. 12, 2011

(54) METHODS FOR ASSET HEALTH MANAGEMENT AND SYSTEMS THEREOF

(75) Inventors: Nabil Nasr, Pittsford, NY (US); Michael Thurston, Penfield, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 11/437,966

(22) Filed: May 19, 2006

(65) Prior Publication Data

US 2006/0282362 A1    Dec. 14, 2006

Related U.S. Application Data

(60) Provisional application No. 60/682,627, filed on May 19, 2005.

(51) Int. Cl.
*G21C 17/00* (2006.01)
(52) U.S. Cl. ............. 702/184; 702/185; 702/34; 700/28
(58) Field of Classification Search .................. None
See application file for complete search history.

(56) References Cited

U.S. PATENT DOCUMENTS

| 5,877,961 | A  | * | 3/1999 | Moore ........................... 700/180 |
| 5,923,834 | A  |   | 7/1999 | Thieret et al. |
| 6,052,631 | A  |   | 4/2000 | Busch et al. |
| 6,151,565 | A  |   | 11/2000 | Lobley et al. |
| 6,161,101 | A  |   | 12/2000 | Guinta et al. |
| 6,330,499 | B1 |   | 12/2001 | Chou et al. |
| 6,397,992 | B1 |   | 6/2002 | Patridge |
| 6,411,908 | B1 | * | 6/2002 | Talbott ........................... 702/34 |
| 6,581,045 | B1 |   | 6/2003 | Watson |
| 2002/0143421 | A1 | * | 10/2002 | Wetzer ........................... 700/100 |
| 2003/0004624 | A1 | * | 1/2003 | Wilson et al. .................... 701/33 |
| 2003/0063766 | A1 | * | 4/2003 | Goldslager et al. ........... 381/345 |
| 2004/0122722 | A1 | * | 6/2004 | Quintus et al. .................... 705/8 |

OTHER PUBLICATIONS

Eckenrode, R.T., "Weighting Multiple Criteria," *Management Science* 12(3):180-192 (1965).
Onodera et al., "Effective Techniques of FMEA at Each Life-Cycle Stage," *Proceedings of the Annual Reliability and Maintainability Symposium*, pp. 50-56 (1997).
MIL-STD-1629A, "Military Standard. Procedures for Performing a Failure Mode, Effects and Criticality Analysis," *Department of Defense*, United States of America (Nov. 24, 1980).

\* cited by examiner

*Primary Examiner* — Manuel L Barbee
(74) *Attorney, Agent, or Firm* — LeClairRyan

(57) ABSTRACT

A method, computer readable medium, and system for optimizing utilization of one or more assets includes obtaining at least one of operational data and condition data for one or more elements of at least one of the assets. At least one of historical maintenance data and life-cycle data for the one or more elements of the at least one of the assets is retrieved. One or more diagnostics on the one or more elements of the at least one of the assets is conducted based on the obtained at least one of the operational data and the condition data. One or more prognostics on the one or more elements of the at least one of the assets is conducted based on the at least one of the obtained operational data and condition data and on the retrieved at least one of the historical maintenance data and the life-cycle data. One or more optimization instructions for the at least one asset are determined based on the conducted diagnostics and prognostics and the determined one or more optimization instructions are displayed.

54 Claims, 3 Drawing Sheets

METHODS FOR ASSET HEALTH MANAGEMENT AND SYSTEMS THEREOF

This application claims the benefit of U.S. Provisional Patent Application Ser. No. 60/682,627, filed May 19, 2005, which is herein incorporated by reference in its entirety.

The subject invention was made with government support from the Office of Naval Research, Grant Number N00014-99-1-0154. The U.S. Government may have certain rights.

FIELD OF THE INVENTION

This invention relates to methods and systems for asset health management.

BACKGROUND

Existing processes for asset management are mostly ad-hoc, and only take into account short term operations planning based on recent maintenance history. Operations and maintenance planning are often performed in isolation and do not balance current costs and operational benefits against the long term issues of total operating costs and asset life-cycle management.

SUMMARY

A method for optimizing utilization of one or more assets in accordance with embodiments of the present invention includes obtaining at least one of operational data and condition data for one or more elements of at least one of the assets. At least one of historical maintenance data and life-cycle data for the one or more elements of the at least one of the assets is retrieved. One or more diagnostics on the one or more elements of the at least one of the assets is conducted based on the obtained at least one of the operational data and the condition data. One or more prognostics on the one or more elements of the at least one of the assets is conducted based on the at least one of the obtained operational data and condition data and on the retrieved at least one of the historical maintenance data and the life-cycle data. One or more optimization instructions for the at least one asset are determined based on the conducted diagnostics and prognostics and the determined one or more optimization instructions are displayed.

A computer readable medium having stored thereon instructions for optimizing utilization of one or more assets in accordance with other embodiments of the present invention includes obtaining at least one of operational data and condition data for one or more elements of at least one of the assets. At least one of historical maintenance data and life-cycle data for the one or more elements of the at least one of the assets is retrieved. One or more diagnostics on the one or more elements of the at least one of the assets is conducted based on the obtained at least one of the operational data and the condition data. One or more prognostics on the one or more elements of the at least one of the assets is conducted based on the at least one of the obtained operational data and condition data and on the retrieved at least one of the historical maintenance data and the life-cycle data. One or more optimization instructions for the at least one asset are determined based on the conducted diagnostics and prognostics and the determined one or more optimization instructions are displayed.

A system for optimizing utilization of one or more assets in accordance with embodiments of the present invention includes one or more sensor systems, one or more databases, at least one diagnostic processing system, at least one prognostic processing system, an optimization processing system, and a display system. The one or more sensor systems obtain at least one of operational data and condition data for one or more elements of at least one of the assets. The one or more databases store at least one of historical maintenance data and life-cycle data for the one or more elements of the at least one of the assets. The diagnostic processing system conducts one or more diagnostics on the one or more elements of the at least one of the assets based on the obtained at least one of the operational data and the condition data. The prognostic processing system conducts one or more prognostics on the one or more elements of the at least one of the assets based on the at least one of the obtained operational data and condition data and on the retrieved at least one of the historical maintenance data and the life-cycle data. The optimization processing system determines one or more optimization instructions for the at least one asset based on the conducted diagnostics and prognostics from the at least one diagnostic processing system and the at least one prognostic system. The display system displays the determined one or more optimization plan or instruction(s).

The present invention provides a method and system for optimizing the utilization of an asset or collection of assets over the entire life-cycle of the asset or collection of assets. Diagnostic methodologies are utilized by the present invention to identify factors, such as degradation and failures of elements of the asset, status of consumables, and operational readiness, and these factors are utilized in the determination of an optimization plan or instruction(s).

Additionally, predictive or prognostic methodologies are used by the present invention to forecast failures. The prognostic methodologies consider the operation and maintenance of the asset and elements of the asset in the context of the entire life cycle. The present invention balances near term and predicted long term maintenance needs against operational requirements and these additional factors are also utilized in the determination of an optimization plan or instruction(s).

Further, the present invention takes into account other factors, such as operational costs, allocation data, and/or availability of upgrades. One or more of these additional factors can also be utilized in the balancing to determine the optimization plan or instruction(s). With the present invention, the consideration of different combinations of these factors allows for an optimal operational and maintenance plan or instruction(s) to be developed.

DETAILED DESCRIPTION

Figure 1:
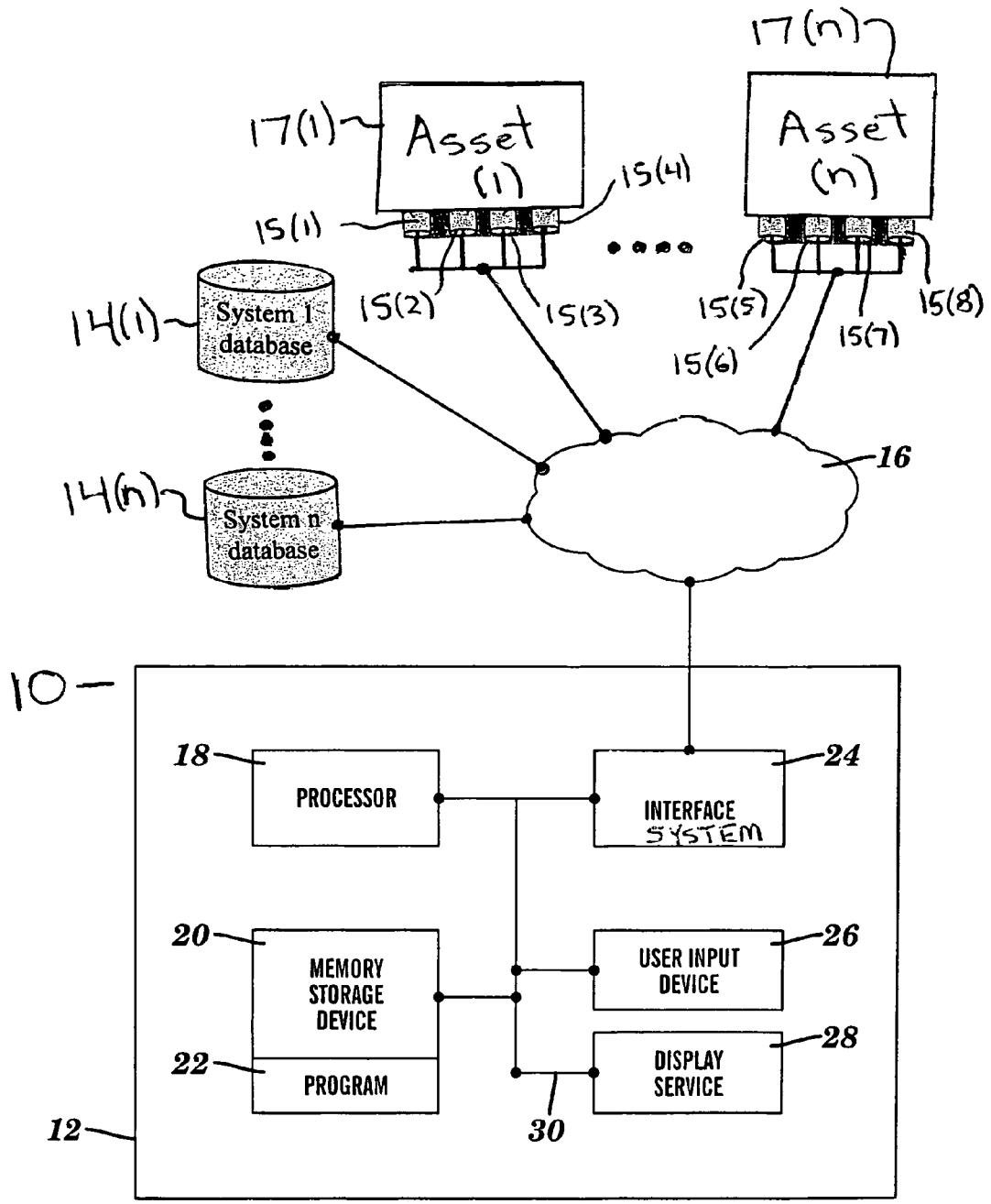
FIG. 1 is a block diagram of an asset health management system in accordance with embodiments of the present invention.

An asset health management system 10 for one or more assets 17(1)-17(n) in accordance with embodiments of the present invention is illustrated in FIG. 1. The asset health management system 10 includes an optimization processing system 12, databases 14(1)-14(n), sensors 15(1)-15(8), and a communication system 16, although the asset health management system 10 can include other types and numbers of systems and components arranged in other manners. The present invention provides a number of advantages including providing a method and system for optimizing the utilization of one of an asset or a collection of assets over the entire life-cycle of the asset.

The optimization processing system 12 is used to determine an optimization plan or instruction(s) for one or more of the assets 17(1)-17(n) based on information, such as diagnostic testing, prognostic testing, cost data, and/or allocation data, although other types and numbers of optimization processing system 12 could be used. For example, the optimization processing system 12 could be coupled to a higher level system which managed the optimization processing system 12 along with other optimization processing systems for other assets.

The optimization system 12 includes at least one processor 18, at least one memory storage device 20 which stores programmed instructions for one or more aspects of the present invention, at least one interface system or device 24, at least one user input device 26, and at least one display device 28 which are coupled together by a bus system 30 or other link, although the remanufacturing processing system 12 may comprise other components, other numbers of the components, and other combinations of the components. In this particular embodiment, the processor 18 executes a program 22 of stored instructions in memory storage device 20 for at least a portion of the method for optimizing utilization of one or more assets 17(1)-17(n) in accordance with one embodiment of the present invention as described herein and set forth in FIG. 2, although the method in accordance with the present invention can be carried out by other systems and also in a variety of other manners. The memory storage device 20 stores these programmed instructions, including program 22 in a memory device, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18. Although in this particular embodiment, the method in accordance with one embodiment of the invention is stored as programmed instructions in the optimization processing system 12 for execution by the processor 18, some or all of the programmed instructions could be stored and executed elsewhere. The input/output interface 20 is used to operatively couple and communicate between the remanufacturing processing system 12 and the component information system 14. The user input device 23 enables an operator to generate and transmit signals or commands to the processor 18, such as inputting data or requests for data about components, although the user input device is optional. A variety of different types of user input devices can be used, such as a keyboard or computer mouse. The display device 28 enables the operator to observe displayed data information, such as the optimization plan or instruction(s). A variety of different types of display devices can be used, such as a CRT or a printer.

The databases 14(1)-14(n) store data, such as historical maintenance data, life cycle data, specifications, performance, and status, for each of the elements of each of the assets 17(1)-17(n). These databases 14(1)-14(n) can be supplemented on an ongoing basis with additional data, such as historical maintenance data, life cycle data, obtained from the management and optimization of the assets 17(1)-17(n). By way of example only, one of the databases 14(1)-14(n) will store tables or graphs, such as the graph shown in FIG. 3 which shows the expected time to failure versus the usage of an element in one of the assets, which can be utilized in determining an optimization plan or instructions(s).

The sensors 15(1)-15(8) are coupled to the optimization processing system 12 via communication system 16, although data from the sensors 15(1)-15(8) can be provided to the optimization processing system 12 in other manners, such as by being input into optimization processing system 12 using user input device 26. The sensors 15(1)-15(8) monitor and provide data about the operation and condition of elements in each of the assets 17(1)-17(n), such as performance data, temperature readings, detected failures, images. In this particular embodiment, sensors 15(1)-15(4) are each coupled to different elements in asset 17(1) and sensors 15(5)-15(8) are each coupled to different elements in asset 17(n), although other numbers and types of sensors for each of the assets 17(1)-17(n) can be used. A variety of different types and numbers of assets 17(1)-17(n) can be managed, such as automobiles, tanks, planes, machines, etc. and a variety of different elements in each asset can be monitored.

Communication system 16 is used to control and manage communication between optimization processing system 12, databases 14(1)-14(n), and sensors 15(1)-15(8) and in this embodiment comprises a wireless network, although other types and numbers of communication systems and/or methods can be used, such as a direct connection, Ethernet, a local area network, a wide area network, or modems and phone lines, each having communications protocols.

Figure 2:
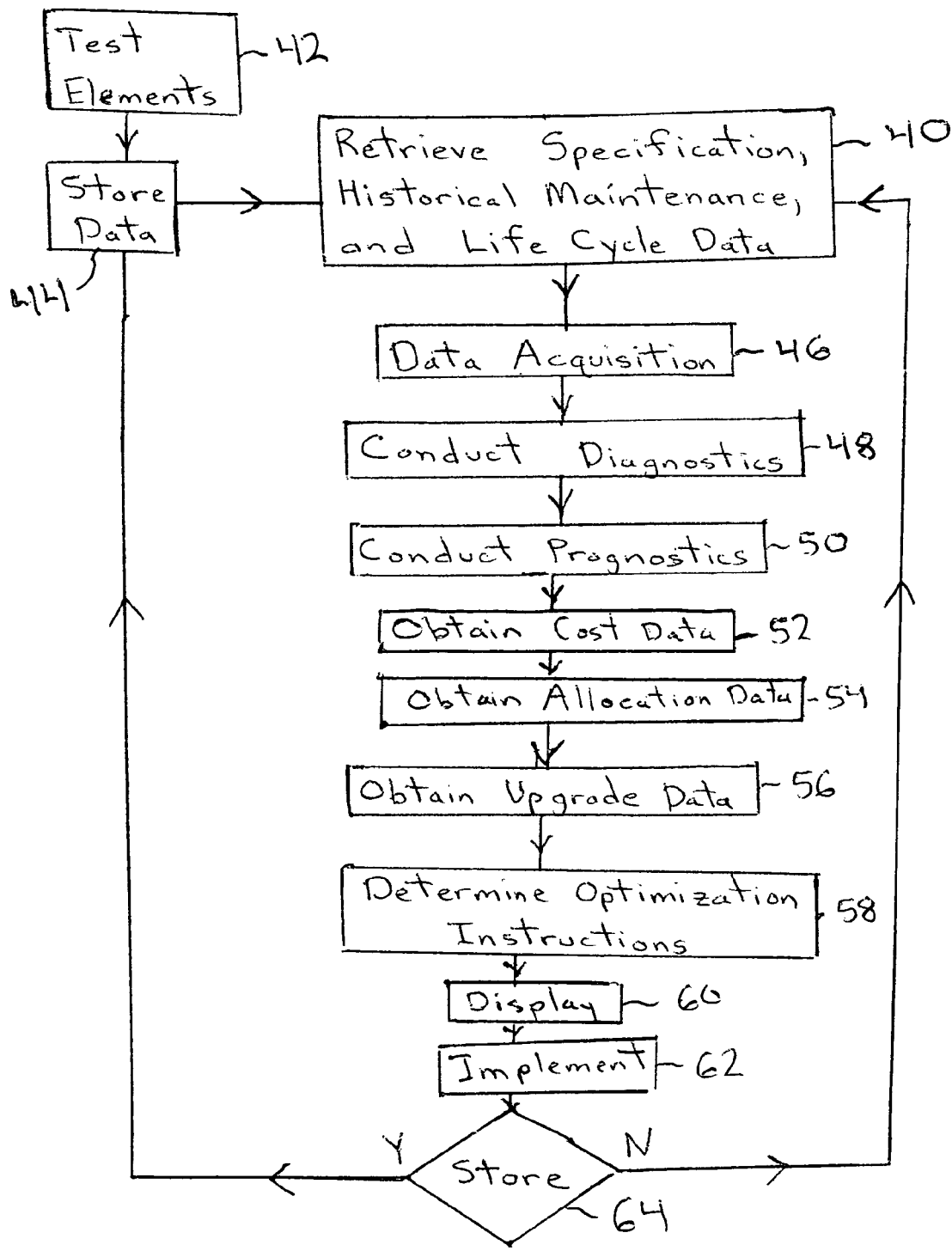
FIG. 2 is a flow chart of a method for optimizing utilization of one or more assets in accordance with other embodiments of the present invention.
Figure 3:
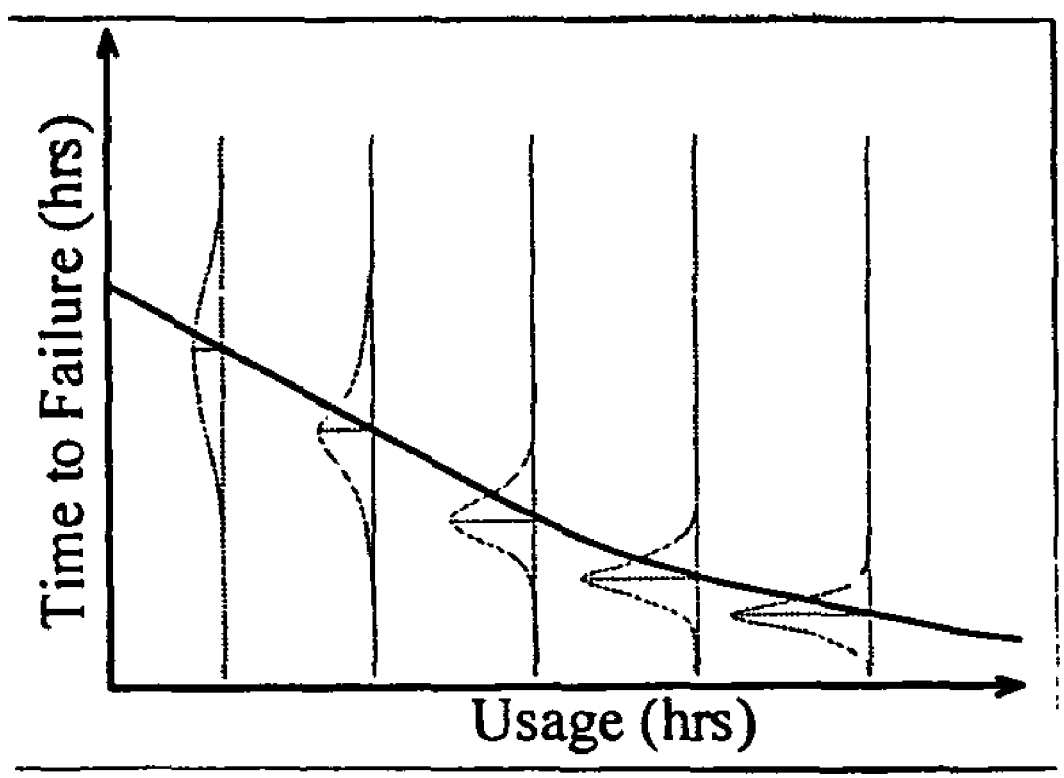
FIG. 3 is a graph of an example of life cycle data for an element in an asset.

The operation of the asset health management system 10 will now be described with reference to FIGS. 1-3. In step 40, the optimization processing system 12 is engaged to manage the optimization of one or more of the assets 17(1)-17(n). The optimization processing system 12 retrieves from one or more of the databases 14(1)-14(n) data, such as the specification data, the historical maintenance data, and life-cycle data for each of the elements of the asset or assets 17(1)-17(n), although the data could be stored and retrieved from other locations. For example, the optimization processing system 12 could search for and retrieve this data from one or more third party sources, such as in the manufacturing specifications provided by the manufacturer of the element or asset. Data generated during the original manufacture of a component, subsystem, and/or system in an element of the asset might be located and stored at another server and the optimization processing system 12 can access and retrieve this data from that server. The specification data may also be obtained from on site evaluations of the components subsystems, and/or systems in the elements of the assets 17(1)-17(n). Typically, this data is input into the optimization processing system 12 using user input device 26, although other manners of inputting the data could be used. In this example: the specification data comprises operational requirements for the assets and an identification of the types of components in the element, operational ranges for the components, functional characteristics of the components, etc.; the historical maintenance data comprises a history of the type, number, and timing for each repair of an element in the asset; and the life cycle data comprises a history of the recorded length of time before each element in the asset failed, although other types of specification, historical maintenance, and/or life cycle data could be used.

By way of example only, assume the assets 17(1)-17(n) comprise a fleet of motor vehicles and the monitored elements in these assets 17(1)-17(n) comprise an electrical system, a fuel system, a braking system, and a steering system. In this example, in step 40 the optimization processing system 12 would retrieve specification data, historical maintenance data, and life-cycle data for the electrical system, the fuel system, the braking system, and the steering system for each of the assets 17(1)-17(n), i.e. the motor vehicles. Additionally, in this example the specification data would include an identification of the components, the performance specifications and operational ranges for each of the components, and the functional characteristics for each of the components in the electrical system, the fuel system, the braking system, the steering system and also the operational requirements for the electrical system, the fuel system, the braking system, the steering system in a motor vehicle, e.g. what the electrical system needs to do for the motor vehicle, what the fuel system needs to do for the motor vehicle, what the braking system needs to do for the motor vehicle, and what the fuel system needs to do for the motor vehicle. Further in this example, the historical maintenance data and life-cycle data for the electrical system, the fuel system, the braking system, and the steering system would comprise stored data on the history of repairs of components or elements in each of the electrical system, the fuel system, the braking system, the steering system and also stored data on the expected life span or cycle for each of the electrical system, the fuel system, the braking system, and the steering system. The data could be in graph or tabular form and also could provide percentages during the life cycle of reaching certain milestones, e.g. after two years a component may have a 95% chance of still being operational after another two years.

In step 42, one or more of the elements of assets which are substantially the same as the elements of the assets 17(1)-17(n) may be tested to obtain historical maintenance data and life cycle data over the life cycle of the asset, although other manners for acquiring this data could be used. For example, the optimization processing system 12 might search for and retrieve this historical maintenance data and life cycle data from one or more third party sources or the optimization processing system 12 could theoretically calculate the historical maintenance data and life cycle data. Next, in step 44 the data obtained by testing or in other manners is stored in one or more of the databases 14(1)-14(n), although the data could be stored at other locations, such as in memory storage device 20 in optimization processing system 12.

In the example where the assets 17(1)-17(n) comprise a fleet of motor vehicles, in step 42 an electrical system, a fuel system, a braking system, and a steering system which are substantially the same as those in the assets 17(1)-17(n) would be tested to obtain the historical maintenance data and the life cycle data for each of the electrical, fuel, braking, and steering systems and the data would be stored in one or more of the databases 14(1)-14(n) in step 44. By way of example only, the type of life cycle data obtained from the testing and stored could be a graph of time to failure versus usage for the electrical system as shown in FIG. 3, although other types of data in other formats could be stored, such as in a table format.

Referring back to FIG. 2, in step 46 the sensors 15(1)-15(4) monitor and obtain operational and condition data about different elements in asset 17(1) and the sensors 15(5)-15(8) monitor and obtain operational and condition data about different elements in asset 17(n), although other numbers and types of sensors could be used to obtain the operational and condition data and other types of data can be monitored and retrieved. By way of example only, operational data can include actual performance information, temperatures, failure rates, status of consumables, etc. and condition data can include physical conditions, such as the level of corrosion, existence of fractures or cracks, level of wear, etc. The sensors 15(1)-15(8) provide the operational and condition data to the optimization processing system 12, although the data can be provided to other management systems.

In the example where the assets 17(1)-17(n) comprise a fleet of motor vehicles, the sensors 15(1) and 15(5) would monitor and obtain operational and condition data about the electrical system, the sensors 15(2) and 15(6) would monitor and obtain operational and condition data about the fuel system, the sensors 15(3) and 15(7) would monitor and obtain operational and condition data about the braking system, and the sensors 15(4) and 15(8) would monitor and obtain operational and condition data about the steering system in the assets 17(1) and 17(n).

In step 48, the optimization processing system 12 conducts one or more diagnostics on the elements of the assets 17(1)-17(n). The diagnostics provide an assessment of the current health state of assets 17(1)-17(n) and may include isolation of a current defect or current set of possible defects in the assets 17(1)-17(n). In these embodiments, the diagnostics on the elements of the assets 17(1)-17(n) are based on the obtained operational and condition data and the retrieved specification data, although diagnostics could be based on information. The obtained operational and condition data for each of the elements provides the optimization processing system 12 with information about the current operating performance and condition or status of degradation for the elements of the assets 17(1)-17(n), although other types of operational and condition data can be obtained. The retrieved specification data for each of the elements provides the optimization processing system 12 with information about the operational characteristics and ranges for the elements of the assets 17(1)-17(n), although other types of specification data can be retrieved. The optimization processing system 12 compares the obtained operational and condition data against this retrieved specification data to provide a diagnosis of each of the monitored elements in the assets 17(1)-17(n), although other types and numbers of diagnostic tests which are based on other information could be conducted. For example, the optimization processing system 12 could run one or more diagnostic tests retrieved from memory storage device 20 or from other sources based on the specification and the obtained operational and condition data for each of the elements. A variety of different types of diagnostics can be used by the optimization processing system 12 based on the particular application.

In the example where the assets 17(1)-17(n) comprise a fleet of motor vehicles, the optimization processing system 12 would conduct one or more diagnostics on the electrical, fuel, braking, and steering systems based on the specification data and the obtained operational and condition data for the electrical, fuel, braking, and steering systems. By way of example, diagnostics might be conducted on the electrical system to test if the alternator, starter, and battery are operating in accordance with the retrieved specification data based on the obtained operational and condition data, e.g. for the battery the operational and condition data might be data on the DC voltage being output and on the ability of the battery to hold a charge.

In step 50, the optimization processing system 12 conducts one or more prognostics on the elements of the assets 17(1)-17(n). The prognostics calculate the remaining useful life (or time to failure) of the assets 17(1)-17(n) and/or the prediction or projection of the future health state or condition of the assets 17(1)-17(n) based on the current and past health state and/or condition. This may also include isolation of a particular likely future defect (or set of possible defects), or evaluation of the progression of a current pre-failure defect in the assets 17(1)-17(n). In these embodiments, the prognostics are based on the obtained operational and condition data, the retrieved specification data, and the retrieved historical maintenance and the life-cycle data, although the prognostics could be based on information. Again, in these embodiments the obtained operational and condition data for each of the elements provides the optimization processing system 12 with information about the current operating performance and condition or status of degradation for the elements of the assets 17(1)-17(n), although other types of operational and condition data can be obtained. Also as discussed earlier, the retrieved specification data for each of the elements provides the optimization processing system 12 with information about the operational characteristics and ranges for the elements of the assets 17(1)-17(n), although other types of specification data can be retrieved. The retrieved historical maintenance and the life-cycle data for each of the elements provides the optimization processing system 12 with information about when near term and long term maintenance typically can be expected and what is the life span for elements of the assets 17(1)-17(n). By way of example only, the life cycle data for an element might comprise a graph of time to failure versus usage for the one of the elements in the assets 17(1)-17(n) as illustrated in FIG. 3.

Referring back to FIG. 2, the optimization processing system 12 uses the obtained operational and condition data, the retrieved specification data, and the historical maintenance and life cycle data to determine estimates or predictions for when one or more of the monitored elements in the assets 17(1)-17(n) will require maintenance which includes replacement, although other types and numbers of prognostic tests could be conducted. For example, the optimization processing system 12 could run one or more prognostic tests retrieved from memory storage device 20 or from other sources based on the retrieved specification data and the obtained operational and condition data for each of the elements. A variety of different types of prognostics can be used by the optimization processing system 12 based on the particular application.

In the example where the assets 17(1)-17(n) comprise a fleet of motor vehicles, the optimization processing system 12 would conduct one or more prognostics on the electrical, fuel, braking, and steering systems based on the specification data and the obtained operational and condition data for the electrical, fuel, braking, and steering systems. By way of example, prognostics might be conducted on the electrical system to predict when the alternator, starter, and battery will require maintenance or will exceed its life expectancy, e.g. the prognostics conduced by the optimization processing system 12 might predict that there is an X % the battery will need to be recharged and have fluid levels filled in two days and that there is a Y % chance the battery will no longer be able to sufficiently hold a charge in two months.

Although in these embodiments, both diagnostics and prognostics are utilized by the system 10 in determining the optimization plan or instruction(s), other combinations could be utilized as well, such as only using diagnostics or only using prognostics. By using both diagnostics and prognostics in these particular embodiments an enhanced optimization plan or instruction(s) is developed for the assets 17(1)-17(n).

In step 52, the optimization processing system 12 may optionally retrieve cost data from one or more of the databases 14(1)-14(n). By way of example only, the cost data retrieved by the optimization processing system 12 can comprise costs for replacing elements in the assets 17(1)-17(n) or operational costs for the current configuration of the assets 17(1)-17(n). This obtained cost data can be incorporated in to factors consider by the optimization processing system 12 for determining the optimization plan or instruction(s). By way of example only, based on an established budget for maintenance costs for the assets 17(1)-17(n) retrieved from memory storage device 20 or obtained from other sources, the optimization plan or instruction(s) might delay maintenance or replacement of an element in each of the assets 17(1)-17(n) if the percentage risk for a failure of one of the elements is below a set percentage and the maintenance cost would currently exceed the established budget for maintenance.

In the example where the assets 17(1)-17(n) comprise a fleet of motor vehicles, the optimization processing system 12 could obtain cost for operating and replacement costs for each of the electrical, fuel, braking, and steering systems, e.g. costs for a battery fluid, fuel, brake pads, steering fluid. Based on this cost data, the optimization processing system 12 can change an optimization plan or instruction(s) to conduct maintenance to hold off on the maintenance for another set period of time during which the predicted risk of problems or failure of elements in the assets is acceptable.

In step 54, the optimization processing system 12 could optionally obtain allocation data about each of the assets, such as the particular location of each of the assets 17(1)-17(n), the destination for each of the assets 17(1)-17(n), and the proximity of one or more service centers for each of the assets 17(1)-17(n). In the example where the assets 17(1)-17(n) comprise a fleet of motor vehicles, the allocation data could be used by the optimization processing system 12 to change the optimization plan or instruction(s) which might currently might not recommend maintenance to schedule an earlier maintenance appointment if the travel time for an one of the vehicles to the next scheduled destination retrieved from memory storage device 20 or other source is greater than the time predicted when the electrical, fuel, braking, and/or steering systems might require maintenance.

In step 56, the optimization processing system 12 can also optionally obtain upgrade data about options for replacing one or more of the elements in the assets 17(1)-17(n). This upgrade data can take a variety of formats, such as the new specification data which needs to be loaded into the databases 14(1)-14(n) for use in future optimization determinations by the optimization processing system 12 if an element is replaced with an upgraded element. By way of another example, the upgrade data could recommend replacing two existing elements with a single upgrade element and again when this replacement takes place the specification data needs to be loaded into the databases 14(1)-14(n) for use in future optimization determinations by the optimization processing system 12.

In the example where the assets 17(1)-17(n) comprise a fleet of motor vehicles, upgrade data might comprises data that two current batteries can be replaced by a single smaller and lighter battery with a longer life cycle. Accordingly, with this upgrade data the optimization processing system 12 might determine the optimization instruction is to replace the two batteries with the new single battery when the life cycle of the two batteries expires or is within a certain predicted time period of expiring. Alternatively, if the upgrade data comprises data that the two current batteries can be replaced by a single smaller and lighter battery with a longer life cycle, but the cost data indicates the single smaller battery is three times more expensive, then the determined optimization instruction may be to replace the two batteries with two of the same batteries, instead of the single battery because of the cost data.

In step 58, the optimization processing system 12 uses the conducted diagnostics and prognostics to determines near term and long term maintenance needs for the elements of the assets 17(1)-17(n) which are then used to determine an optimization plan or instruction(s). Additionally, the optimization processing system 12 can factor in other obtained and retrieved data, such as cost, allocation data, and/or upgrade data to further refine the determined optimization plan or instruction(s).

In the example where the assets 17(1)-17(n) comprise a fleet of motor vehicles, the diagnostics might not indicate any current failures with the electrical, fuel, braking, or steering systems, but might indicate degradation of the charge holding capacity of the two batteries in the electrical system and the prognostics might indicate the life cycle for the two batteries is nearing the end and has a high percentage chance of near term failure. As a result, the optimization plan or instruction(s) determined by the optimization processing system 12 would be to replace the two batteries with two new batteries. As discussed in the examples above, this optimization instruction may be further refined by one or more of the cost data, allocation data, and upgrade data.

In step 60, the optimization processing system 12 displays the optimization plan or instruction(s) on the display device 28, although the optimization plan or instruction(s) could be displayed or output in other manners. For example, the optimization plan or instruction(s) could be put into an email and sent to one or more designated parties assigned to oversee the management of the asset or assets or the optimization plan or instruction(s) could be sent to and printed at a remote printer.

In step 62, the optimization processing system 12 optionally may implement the optimization plan or instruction(s) for one or more of the assets 17(1)-17(n). By way of example only, this implementation of the optimization instruction might be downloading a new software routine to the assets 17(1)-17(n) to improve their operating efficiencies, ordering replacement elements for the assets 17(1)-17(n), or emailing instructions to one or more other systems or parties to provide notification that a particular optimization in an element in one or more of the assets 17(1)-17(n) needs to take place.

In step 64, the optimization processing system 12 determines whether to store the recently gathered data, such as the historical maintenance data and the life cycle data, in one or more of the databases 14(1)-14(n). As a result, one of the advantages of the present invention is that the historical maintenance and life cycle data for assets being optimized is being refined to reflect the most recent data. Additionally, when multiple assets of the same type are being managed, the optimization processing system 12 is able to more quickly obtain and store this recent data The present invention provides a method and system for optimizing the utilization of an asset or collection of assets over the entire life-cycle of the asset or collection of assets. Diagnostic methodologies are utilized by the present invention to identify factors, such as degradation and failures of elements of the asset, status of consumables, and operational readiness, and these factors are utilized in the determination of an optimization plan or instruction(s).

Additionally, predictive or prognostic methodologies are used by the present invention to forecast failures. The prognostic methodologies consider the operation and maintenance of the asset and elements of the asset in the context of the entire life cycle. The present invention balances near term and predicted long term maintenance needs against operational requirements are also utilized in the determination of an optimization plan or instruction(s).

Further, the present invention also balances the implications of operational requirements versus near and long term maintenance needs against total asset life cycle operational costs. With the present invention, the consideration of these factors allows for an optimal operational and maintenance plan or instruction(s) to be developed.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefore, is not intended to limit the claimed processes to any order except as may be explicitly specified in the claims. Accordingly, the invention is limited only by the following claims and equivalents thereto.

What is claimed is:

1. A method for optimizing utilization of one or more assets, the method comprising:
   obtaining at an optimization processing apparatus operational data and physical condition data for one or more elements of at least one of the assets and specification data, historical maintenance data and life-cycle data for the one or more elements of the at least one of the assets;
   conducting with the optimization processing apparatus one or more diagnostics on the one or more elements of the at least one of the assets based on the obtained the operational data, the physical condition data, and the retrieved specification data;
   conducting with the optimization processing apparatus one or more prognostics on the one or more elements of the at least one of the assets based on the obtained operational data, the physical condition data, the specification data, the historical maintenance data and the life-cycle data;
   determining one or more optimization instructions with optimization processing apparatus for the at least one asset based on the conducted diagnostics and prognostics, wherein at least one of the conducting one or more diagnostics and the conducting one or more prognostics further comprises determining one or more maintenance needs related to at least one of the one of the one or more elements of the at least one of the assets in a near term comprising before a first designated period of time and over a long term comprising after the first designated period of time and wherein the one or more optimization instructions are further based on the determined near term and long term maintenance needs; and
   displaying with the optimization processing apparatus the determined one or more optimization instructions.

2. The method as set forth in claim 1 wherein the operational data comprises data on the performance of the one or more elements.

3. The method as set forth in claim 1 wherein the operational data comprises data on a status of one or more consumables in the at least one asset.

4. The method as set forth in claim 1 wherein the condition data comprises data on at least one of status of degradation and fault detection in the one or more elements in the at least one asset.

5. The method as set forth in claim 1 wherein the obtaining further comprises obtaining the operational data and the condition data and wherein the conducting one or more diagnostics and the conducting one or more prognostics is further based on the obtained operational and condition data.

6. The method as set forth in claim 1 further comprising recording and storing additional historical maintenance data and additional life cycle data for the one or more of the elements of the at least one of the assets with the historical maintenance data and the life-cycle data.

7. The method as set forth in claim 6 wherein the recording and storing further comprises recording and storing additional historical maintenance data and additional life cycle data for the one or more of the elements of two or more of the assets with the historical maintenance data and the life-cycle data.

8. The method as set forth in claim 1 further comprising:
testing one or more elements which are substantially the same as the one or more elements of the at least one of the assets being optimized to obtain the historical maintenance data and the life-cycle data for the one or more elements of the at least one of the assets; and
storing the obtained historical maintenance data and life-cycle data for the one or more elements.

9. The method as set forth in claim 1 further comprises obtaining location related data about at least one of the assets, wherein the determining the one or more optimization instructions is further based on the obtained location related data.

10. The method as set forth in claim 9 wherein the location related data comprises at least one of a current location of the at least one of the assets, a destination of the at least one of the assets, and a proximity of the at least one of the assets to one or more service centers.

11. The method as set forth in claim 1 further comprising implementing one or more of the optimization instructions on the at least one asset.

12. The method as set forth in claim 1 further comprising obtaining data on one or more upgrades for one or more of the elements of the at least one asset, the one or more upgrades have at least one property which is different than the one or more elements had when new, wherein the determining one or more optimization instructions for the at least one asset is further based on the obtained data on the one or more upgrades.

13. The method as set forth in claim 1 further comprising obtaining cost data for replacing one or more of the elements of the at least one asset, wherein the determining the one or more optimization instructions for the at least one asset is further based on the obtained cost data.

14. The method as set forth in claim 13 further comprising obtaining data on one or more upgrades for replacing two or more of the elements of the at least one asset with a smaller number of one or more upgraded elements, wherein the determining one or more optimization instructions for the at least one asset is further based on the obtained replacement data.

15. The method as set forth in claim 1 wherein the retrieving specification data further comprises retrieving specification data for at least one of the one or more elements generated during the original manufacture of the at least one of the one or more elements.

16. The method as set forth in claim 1 wherein the obtaining the physical condition data further comprises obtaining one or more images of the one or more elements of the at least one of the assets and wherein the determining the one or more optimization instructions with the optimization processing system for the at least one asset based on the conducted diagnostics and prognostic which are further based on the obtained one or more images.

17. A non-transitory computer readable medium having stored thereon instructions for optimizing utilization of one or more assets comprising machine executable code which when executed by at least one processor, causes the processor to perform steps comprising:

obtaining operational data and physical condition data for one or more elements of at least one of the assets and specification data, historical maintenance data and life-cycle data for the one or more elements of the at least one of the assets;
conducting one or more diagnostics on the one or more elements of the at least one of the assets based on the obtained the operational data, the physical condition data, and the retrieved specification data;
conducting one or more prognostics on the one or more elements of the at least one of the assets based on the obtained operational data, the physical condition data, the specification data, the historical maintenance data and the life-cycle data;
determining one or more optimization instructions for the at least one asset based on the conducted diagnostics and prognostics, wherein at least one of the conducting one or more diagnostics and the conducting one or more prognostics further comprises determining one or more maintenance needs related to at least one of the one of the one or more elements of the at least one of the assets in a near term comprising before a first designated period of time and over a long term comprising after the first designated period of time and wherein the one or more optimization instructions are further determined based on the determined near term and long term maintenance needs; and
displaying the determined one or more optimization instructions.

18. The medium as set forth in claim 17 wherein the operational data comprises data on the performance of the one or more elements.

19. The medium as set forth in claim 17 wherein the operational data comprises data on a status of one or more consumables in the at least one asset.

20. The medium as set forth in claim 17 wherein the condition data comprises data on at least one of status of degradation and fault detection in the one or more elements in the at least one asset.

21. The medium as set forth in claim 17 wherein the obtaining further comprises obtaining the operational data and the condition data and wherein the conducting one or more diagnostics and the conducting one or more prognostics is further based on the obtained operational and condition data.

22. The medium as set forth in claim 17 further comprising recording and storing additional historical maintenance data and additional life cycle data for the one or more of the elements of the at least one of the assets with the historical maintenance data and the life-cycle data.

23. The medium as set forth in claim 22 wherein the recording and storing further comprises recording and storing additional historical maintenance data and additional life cycle data for the one or more of the elements of two or more of the assets with the historical maintenance data and the life-cycle data.

24. The medium as set forth in claim 17 further comprising:
testing one or more elements which are substantially the same as the one or more elements of the at least one of the assets being optimized to obtain the historical maintenance data and the life-cycle data for the one or more elements of the at least one of the assets; and
storing the obtained historical maintenance data and life-cycle data for the one or more elements.

25. The medium as set forth in claim 17 further comprises obtaining location related data about at least one of the assets, wherein the determining the one or more optimization instructions is further based on the obtained location related data.

26. The medium as set forth in claim 25 wherein the location related data comprises at least one of a current location of the at least one of the assets, a destination of the at least one of the assets, and a proximity of the at least one of the assets to one or more service centers.

27. The medium as set forth in claim 17 further comprising implementing one or more of the optimization instructions on the at least one asset.

28. The medium as set forth in claim 17 further comprising obtaining data on one or more upgrades for one or more of the elements of the at least one asset, the one or more upgrades have at least one property which is different than the one or more elements had when new, wherein the determining one or more optimization instructions for the at least one asset is further based on the obtained data on the one or more upgrades.

29. The medium as set forth in claim 17 further comprising obtaining cost data for replacing one or more of the elements of the at least one asset, wherein the determining the one or more optimization instructions for the at least one asset is further based on the obtained cost data.

30. The medium as set forth in claim 29 further comprising obtaining data on one or more upgrades for replacing two or more of the elements of the at least one asset with a smaller number of one or more upgraded elements, wherein the determining one or more optimization instructions for the at least one asset is further based on the obtained replacement data.

31. The medium as set forth in claim 17 wherein the retrieving specification data further comprises retrieving specification data for at least one of the one or more elements generated during the original manufacture of the at least one of the one or more elements.

32. The medium as set forth in claim 17 wherein the obtaining the physical condition data further comprises obtaining one or more images of the one or more elements of the at least one of the assets and wherein the determining the one or more optimization instructions for the at least one asset based on the conducted diagnostics and prognostics which are further based on the obtained one or more images.

33. A system for optimizing utilization of one or more assets, the system comprising:
one or more data acquisition systems that obtain at least one of operational data and physical condition data for one or more elements of at least one of the assets and specification data, historical maintenance data, and life-cycle data for the one or more elements of the at least one of the assets;
at least one diagnostic processing system that conducts one or more diagnostics on the one or more elements of the at least one of the assets based on the obtained the operational data, the physical condition data, and the specification data on the one or more elements;
at least one prognostic processing system that conducts one or more prognostics on the one or more elements of the at least one of the assets based on the obtained operational data, the physical condition data, the specification data, the historical maintenance data, and the life-cycle data;
an optimization processing system that determines one or more optimization instructions for the at least one asset based on the conducted diagnostics and prognostics from the at least one diagnostic processing system and the at least one prognostic processing system, wherein at least one of the diagnostic processing system and the prognostic processing system determines one or more maintenance needs related to at least one of the one of the one or more elements of the at least one of the assets in a near term comprising before a first designated period of time and over a long term comprising after the first designated period of time and wherein the optimization processing system determines the one or more optimization instructions further based on the determined near term and long term maintenance needs; and
a display system that displays the determined one or more optimization instructions.

34. The system as set forth in claim 33 wherein the one or more sensor systems obtain the operational data which comprises data on the performance of the one or more elements.

35. The system as set forth in claim 33 wherein the one or more sensor systems obtain the operational data which comprises data on a status of one or more consumables in the at least one asset.

36. The system as set forth in claim 33 wherein the one or more sensor systems obtain the condition data which comprises data on at least one of status of degradation and fault detection in the one or more elements in the at least one asset.

37. The system as set forth in claim 33 wherein the one or more sensor systems obtain the operational data and the condition data and wherein the at least one diagnostic processing system conducts the one or more diagnostics and the at least one prognostic processing system conducts one or more prognostics further based on the obtained operational and condition data.

38. The system as set forth in claim 33 wherein the optimization processing system records and stores additional historical maintenance data and additional life cycle data for the one or more of the elements of the at least one of the assets in the one or more databases with the historical maintenance data and the life cycle data.

39. The system as set forth in claim 38 wherein the optimization processing system records and stores additional historical maintenance data and additional life cycle data for the one or more of the elements of two or more of the assets in the one or more databases with the historical maintenance data and the life cycle data.

40. The system as set forth in claim 33 further comprising at least one testing system that test one or more elements which are substantially the same as the one or more elements of the at least one of the assets being optimized to obtain the historical maintenance data and the life-cycle data for the one or more elements of the at least one of the assets, wherein the obtained historical maintenance and the life-cycle data for the one or more elements of the at least one of the assets are stored in the one or more databases.

41. The system as set forth in claim 33 further comprises a monitoring system that obtains location related data about at least one of the assets, wherein the optimization processing system determines the one or more optimization instructions further based on the obtained location related data.

42. The system as set forth in claim 41 wherein the location related data comprises at least one of a current location of the at least one of the assets, a destination of the at least one of the assets, and a proximity of the at least one of the assets to one or more service centers.

43. The system as set forth in claim 33 wherein the optimization processing system initiates an implementation of one or more of the optimization instructions on the at least one asset.

44. The system as set forth in claim 33 wherein the optimization processing system determines the one or more optimization instructions for the at least one asset further based on obtained data on one or more upgrades for one or more of the elements of the at least one asset, the one or more upgrades have at least one property which is different than the one or more elements had when new.

45. The system as set forth in claim 33 wherein the optimization processing system determines the one or more optimization instructions for the at least one asset further based on obtained cost data for replacing one or more of the elements of the at least one asset.

46. The system as set forth in claim 45 wherein the optimization processing system determines the one or more optimization instructions for the at least one asset further based on obtained data on one or more upgrades for replacing two or more of the elements of the at least one asset with a smaller number of one or more upgraded elements.

47. The system as set forth in claim 33 wherein the one or more databases that store specification data further comprises storing specification data for at least one of the one or more elements generated during the original manufacture of the at least one of the one or more elements.

48. The system as set forth in claim 33 wherein the one or more data acquisition systems obtain one or more images of the one or more elements of the at least one of the assets and the optimization processing system that determines the one or more optimization instructions for the at least one asset based on the conducted diagnostics and prognostics which are further based on the obtained one or more images.

49. A method for optimizing utilization of one or more assets, the method comprising:
   obtaining at an optimization processing apparatus operational data and physical condition data for one or more elements of at least one of the assets and specification data, historical maintenance data and life-cycle data for the one or more elements of the at least one of the assets;
   conducting with the optimization processing apparatus one or more diagnostics on the one or more elements of the at least one of the assets based on the obtained the operational data, the physical condition data, and the retrieved specification data;
   conducting with the optimization processing apparatus one or more prognostics on the one or more elements of the at least one of the assets based on the obtained operational data, the physical condition data, the specification data, the historical maintenance data and the life-cycle data;
   obtaining at the optimization processing apparatus cost data for replacing one or more of the elements of the at least one asset, wherein the obtaining cost data further comprises obtaining a maintenance budget for the at least one of the assets, wherein at least one of the conducting one or more diagnostics and the conducting one or more prognostics determines a risk of failure of at least one of the one or more elements of the at least one of the assets;
   determining one or more optimization instructions with the optimization processing apparatus for the at least one asset based on the conducted diagnostics and prognostics, the obtained cost data, the obtained maintenance budget and the determined risk of failure;
   displaying with the optimization processing apparatus the determined one or more optimization instructions.

50. A non-transitory computer readable medium having stored thereon instructions for optimizing utilization of one or more assets comprising machine executable code which when executed by at least one processor, causes the processor to perform steps comprising:
   obtaining operational data and physical condition data for one or more elements of at least one of the assets and specification data, historical maintenance data and life-cycle data for the one or more elements of the at least one of the assets;
   conducting one or more diagnostics on the one or more elements of the at least one of the assets based on the obtained the operational data, the physical condition data, and the retrieved specification data;
   conducting one or more prognostics on the one or more elements of the at least one of the assets based on the obtained operational data, the physical condition data, the specification data, the historical maintenance data and the life-cycle data;
   obtaining cost data for replacing one or more of the elements of the at least one asset, wherein the obtaining cost data further comprises obtaining a maintenance budget for the at least one of the assets, wherein at least one of the conducting one or more diagnostics and the conducting one or more prognostics determines a risk of failure of at least one of the one or more elements of the at least one of the assets;
   determining one or more optimization instructions for the at least one asset based on the conducted diagnostics and prognostics, the obtained cost data, the obtained maintenance budget and the determined risk of failure; and
   displaying the determined one or more optimization instructions.

51. A system for optimizing utilization of one or more assets, the system comprising:
   one or more data acquisition systems that obtain at least one of operational data and physical condition data for one or more elements of at least one of the assets and specification data, historical maintenance data, and life-cycle data for the one or more elements of the at least one of the assets;
   at least one diagnostic processing system that conducts one or more diagnostics on the one or more elements of the at least one of the assets based on the obtained the operational data, the physical condition data, and the specification data on the one or more elements;
   at least one prognostic processing system that conducts one or more prognostics on the one or more elements of the at least one of the assets based on the obtained operational data, the physical condition data, the specification data, the historical maintenance data, and the life-cycle data;
   an optimization processing system that determines one or more optimization instructions for the at least one asset based on the conducted diagnostics and prognostics from the at least one diagnostic processing system and the at least one prognostic processing system, wherein the optimization processing system determines the one or more optimization instructions for the at least one asset further based on an obtained maintenance budget for the at least one assets and a risk of failure of at least one of the one of the one or more elements of the at least one of the assets determined by at least one of the prognostic processing system and the diagnostic processing system; and
   a display system that displays the determined one or more optimization instructions.

52. A method for optimizing utilization of one or more assets, the method comprising:
   obtaining at an optimization processing apparatus at least one of operational data and condition data for one or more elements of at least one of the assets, data on one or more upgrades for replacing two or more of the elements of the at least one asset with a smaller number of one or more upgraded elements, and at least one of specification data, historical maintenance data and life-cycle data for the one or more elements of the at least one of the assets;

conducting with the optimization processing apparatus one or more diagnostics on the one or more elements of the at least one of the assets based on the obtained at least one of the operational data and the condition data;

conducting with the optimization processing apparatus one or more prognostics on the one or more elements of the at least one of the assets based on the obtained at least one of the operational data and the condition data and the obtained at least one of the specification data, the historical maintenance data and the life-cycle data;

determining with the optimization processing apparatus one or more optimization instructions for the at least one asset based on the conducted diagnostics and prognostics and the obtained replacement data; and displaying with the optimization processing apparatus the determined one or more optimization instructions.

53. A non-transitory computer readable medium having stored thereon instructions for optimizing utilization of one or more assets comprising machine executable code which when executed by at least one processor, causes the processor to perform steps comprising:

obtaining at least one of operational data and condition data for one or more elements of at least one of the assets, data on one or more upgrades for replacing two or more of the elements of the at least one asset with a smaller number of one or more upgraded elements, and at least one of specification data, historical maintenance data and life-cycle data for the one or more elements of the at least one of the assets;

conducting one or more diagnostics on the one or more elements of the at least one of the assets based on the obtained at least one of the operational data and the condition data;

conducting one or more prognostics on the one or more elements of the at least one of the assets based on the obtained at least one of the operational data and the condition data and the obtained at least one of the specification data, the historical maintenance data and the life-cycle data;

determining one or more optimization instructions for the at least one asset based on the conducted diagnostics and prognostics and the obtained replacement data; and displaying the determined one or more optimization instructions.

54. A system for optimizing utilization of one or more assets, the system comprising:

one or more data acquisition systems that obtain at least one of operational data and condition data for one or more elements of at least one of the assets, data on one or more upgrades for replacing two or more of the elements of the at least one asset with a smaller number of one or more upgraded elements, and at least one of specification data, historical maintenance data and life-cycle data for the one or more elements of the at least one of the assets;

at least one diagnostic processing system that conducts one or more diagnostics on the one or more elements of the at least one of the assets based on the obtained at least one of the operational data and the condition data;

at least one prognostic processing system that conducts one or more prognostics on the one or more elements of the at least one of the assets based on obtained at least one of the operational data and the condition data and the obtained at least one of the specification data, the historical maintenance data and the life-cycle data;

an optimization processing system that determines one or more optimization instructions for the at least one asset based on the conducted diagnostics and prognostics from the at least one diagnostic processing system and the at least one prognostic processing system and the obtained replacement data; and a display system that displays the determined one or more optimization instructions.

\* \* \* \* \*